United States Patent
Lin (10) Patent No.: US 8,316,210 B2
(45) Date of Patent: Nov. 20, 2012

(54) DIVIDING A LOGICAL MEMORY SPACE INTO RANGES AND SETS FOR ADDRESS TRANSLATION

(75) Inventor: Jen-Wen Lin, Kaohsiung (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 406 days.

(21) Appl. No.: 12/756,272

(22) Filed: Apr. 8, 2010

(65) Prior Publication Data

US 2011/0087829 A1 Apr. 14, 2011

(30) Foreign Application Priority Data

Oct. 9, 2009 (TW) .............................. 98134250 A (51) Int. Cl.
*G06F 12/10* (2006.01)

(52) U.S. Cl. .................. 711/206; 711/103; 711/E12.03; 711/E12.059

(58) Field of Classification Search ................. 711/103, 711/206, 207, E12.03, E12.058, E12.059
See application file for complete search history.

(56) References Cited

U.S. PATENT DOCUMENTS

| | | | |
|---|---|---|---|
| 7,296,139 B1 * | 11/2007 | Case et al. | 711/209 |
| 2009/0113121 A1 * | 4/2009 | Lee et al. | 711/103 |
| 2010/0030999 A1 * | 2/2010 | Hinz | 711/206 |

OTHER PUBLICATIONS

Chin-Hsien Wu, et al., "A Space-Efficient Caching Mechanism for Flash-Memory Address Translation," IEEE International Symposium on Object and Component-Oriented Real-Time Distributed Computing, 2006.*

* cited by examiner

*Primary Examiner* — Hal Schnee
(74) *Attorney, Agent, or Firm* — McClure, Qualey & Rodack LLP (57) ABSTRACT

The invention provides a data storage device. In one embodiment, the data storage device comprises a storage medium, a random access memory, and a controller. The storage medium stores a plurality of link tables. The random access memory comprises a plurality of storage units respectively corresponding to a plurality of logical address ranges. The controller receives a target logical address from the host, determines a target link table corresponding to a logical address set comprising the target logical address, determines a target storage unit corresponding to a logical address range comprising the target logical address, determines whether the target storage unit has stored the target link table, and when the target storage unit has stored the target link table, determines a target physical address mapped to the target logical address according to a mapping relationship stored in the target link table, and accesses data stored in the storage medium according to the target physical address.

18 Claims, 5 Drawing Sheets

DIVIDING A LOGICAL MEMORY SPACE INTO RANGES AND SETS FOR ADDRESS TRANSLATION

CROSS REFERENCE TO RELATED APPLICATIONS

This application claims priority of Taiwan Patent Application No. 98134250, filed on Oct. 9, 2009, the entirety of which is incorporated by reference herein.

BACKGROUND OF THE INVENTION

1. Field of the Invention

The invention relates to data storage devices, and more particularly to flash memories.

2. Description of the Related Art

A data storage device, such as a memory card, stores data for a host. Generally, a data storage device comprises a storage medium and a controller. The storage medium is for data storage and may be a hard disk or a flash memory. The controller operates as an interface between the host and the storage medium, and transfers access commands sent from the host to the storage medium. When the host sends an access command to the controller, the host points out data to be accessed with a logical address. The storage medium, however, stores data according to physical addresses. The controller therefore must convert the logical address sent from the host to a physical address, and then sends the physical address to the storage medium, wherein the storage medium is requested to access data stored according to the physical address.

Generally, a controller converts a logical address to a physical address according to a link table. The link table stores a mapping relationship between logical and physical addresses. Because amount of data of the mapping relationship stored in the link table is large, the mapping relationship between the logical and physical addresses may be divided into mapping relationships of a plurality logical address ranges to be stored in a plurality of link tables. The link tables are stored in the storage medium. The data storage device comprises a random access memory for storing temporary data used by the controller. The random access memory has limited data capacity. Thus, the controller merely loads link tables, being currently used by the controller, from the storage medium to the random access memory.

Figure 1:
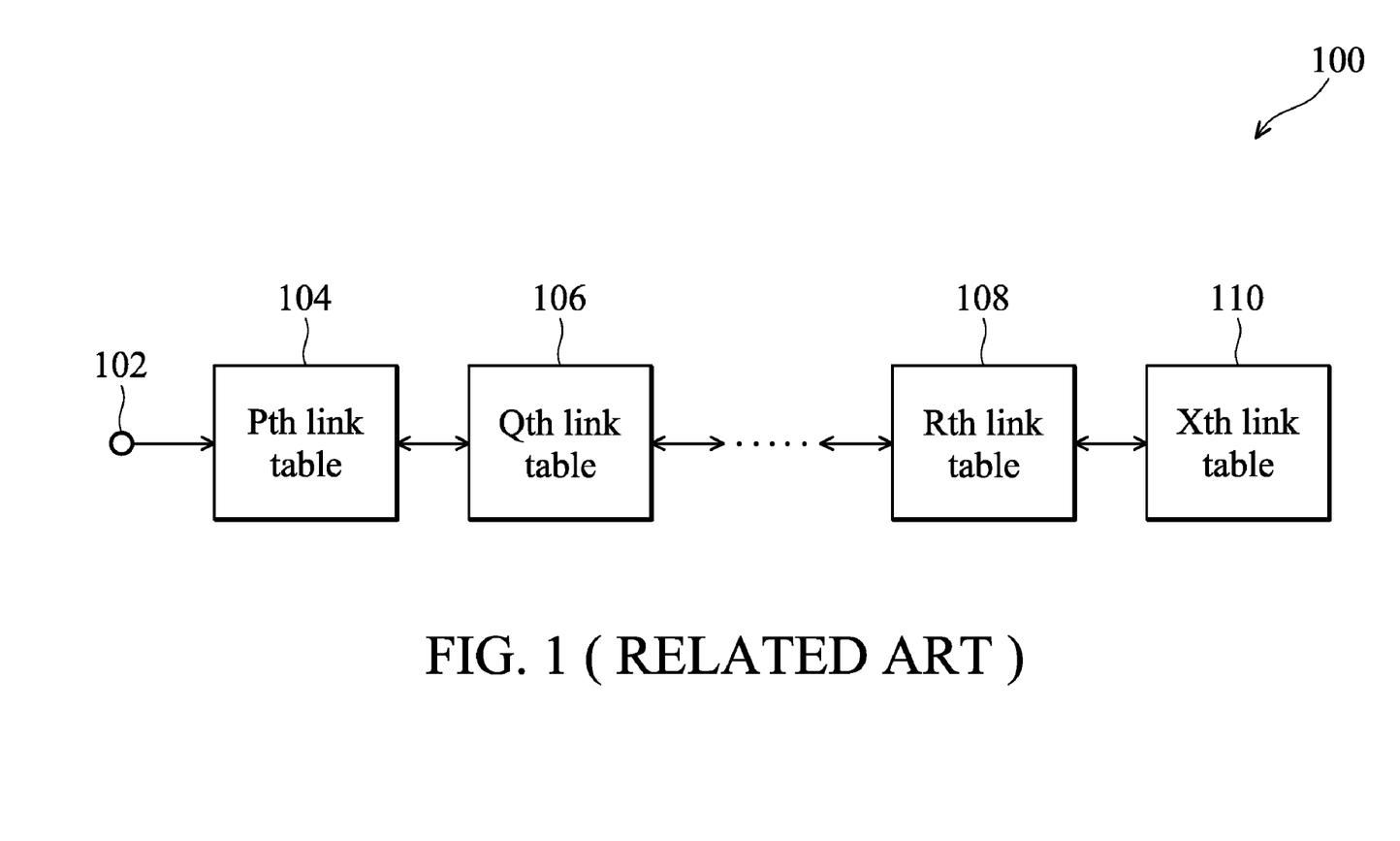
FIG. 1 is a schematic diagram of a plurality of link tables of a link list stored in a random access memory.

For convenient searching, the link tables stored in the random access memory are often arranged to form a link list. Referring to FIG. 1, a schematic diagram of a plurality of link tables of a link list 100 stored in a random access memory is shown. The link list 100 comprises a start pointer 102 and a series of link tables 104~110. The start pointer 102 points to a P-th link table 104 with a first order. A tail pointer of the P-th link table 104 is pointed to a Q-th link table 106 with a second order. The link tables 104~110 of the link list 100 are therefore connected by tail pointers, and a last link table of the link list 100 is an X-th link table 110. The link tables 104~110 of the link list 100 are the most recent link tables used by the controller. When the controller wants to convert a target logical address which is not stored in the link tables of the link list 100, the controller deletes the X-th link table 110 from the random access memory, reads a new link table comprising the target logical address from the storage medium, and stores the new link table in the random access memory as a component link table of the link list 100.

Figure 2:
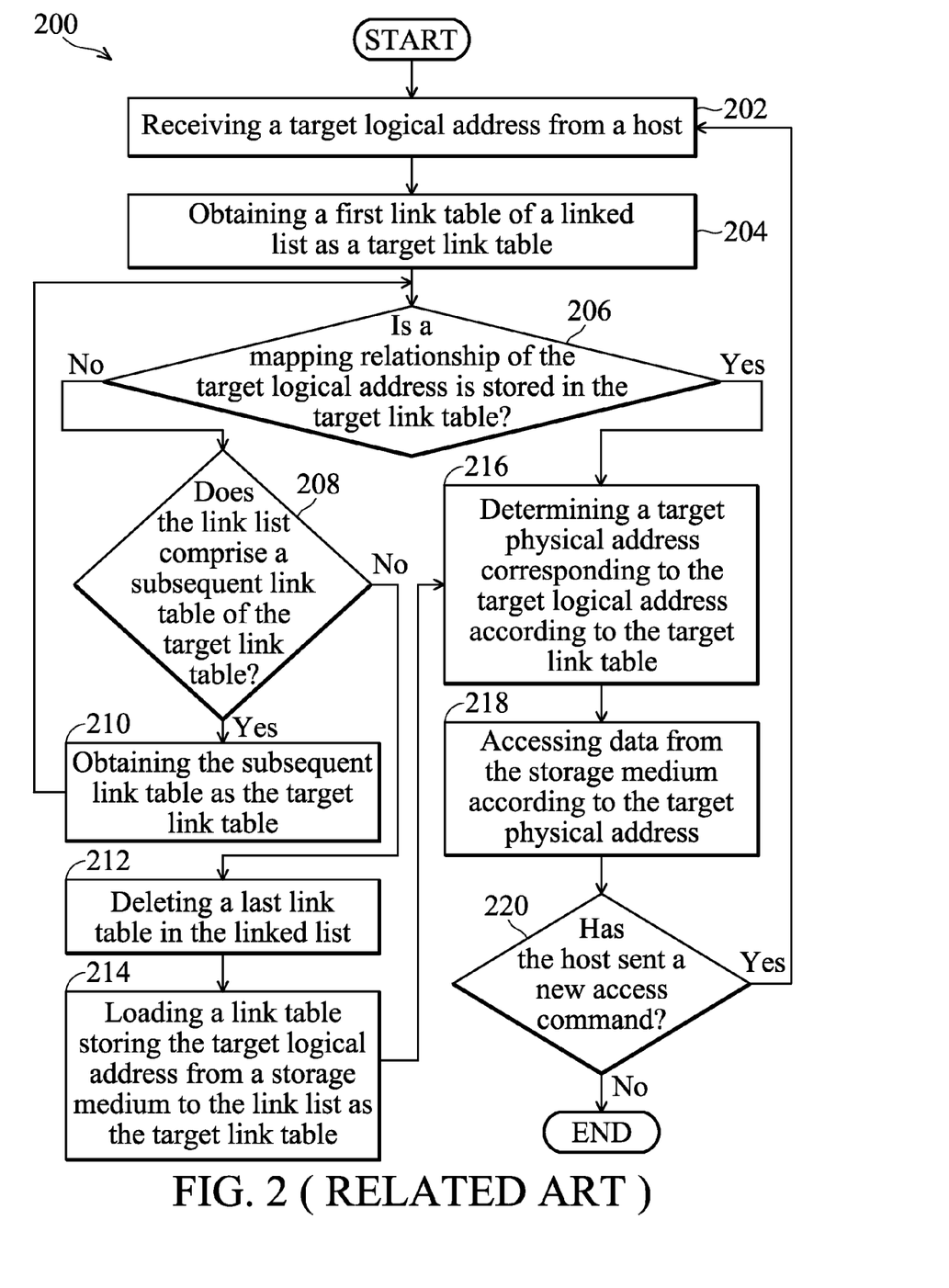
FIG. 2 is a flowchart of a conventional data access method of a storage medium.

Referring to FIG. 2, a flowchart of a conventional data access method 200 of a storage medium is shown. A controller first receives a target logical address from a host (step 202). To determine whether a link list stored in a random access memory comprises a specific link table storing a mapping relationship of the target logical address, the controller must sequentially search a plurality of link tables of the link list for the target logical address. First, the controller obtains a first link table of the linked list as a target link table (step 204). The controller then checks whether a mapping relationship of the target logical address is stored in the target link table (step 206). If a mapping relationship of the target logical address is not stored in the target link table, the controller then determines a subsequent link table pointed out by a tail pointer of the target link table, and obtains the subsequent link table as the new target link table (step 210), and continues to check whether a mapping relationship of the target logical address is stored in the new target link table (step 206). Steps 206, 208, and 210 are repeatedly executing in a loop, until the controller finds the target link table storing the mapping relationship of the target logical address (step 206) or the link list does not comprise a subsequent link table of the target link table (step 208).

When the link list does not comprise a subsequent link table of the target link table (step 208), it is determined that the random access memory does not comprise the specific link table storing the mapping relationship of the target logical address. The controller then deletes a last link table of the link list from the random access memory (step 212), and then loads the specific link table storing the mapping relationship of the target logical address from the storage medium to the link list as the target link table (step 214). Thus, the random access memory now has a stored a target link table storing the mapping relationship of the target logical address. The controller then converts the target logical address to a target physical address according to the mapping relationship stored in the target link table (step 216), and then accesses data from the storage medium according to the target physical address (step 218). Finally, if the host sends a new access command to the data storage device (step 220), the controller performs steps 202~218 again to convert a new target logical address of the new access command to a new target physical address and access data from the storage medium according to the new target physical address.

The conventional data access method 200 has shortcomings. When the controller receives a new target logical address, the controller must repeatedly execute steps 204~210 in a loop to sequentially search all link tables of the link list for the new target logical address. Execution of the steps in a loop, however, requires a long time period and causes a delay in the data access process. For example, assume that a random access memory has a data capacity of 16 M Bytes, and a link table has stored mapping relationships with a data amount of 4K Bytes. The random access memory therefore stores almost 4K link tables, and the controller must search 4K link tables for the target logical address to determine whether the link tables stored in the random access memory comprises a mapping relationship of the target logical address, causing a long delay period and degrading performance of the data storage device. Thus, a data access method for efficiently determining whether a random access memory has stored a mapping relationship of a target logical address is required.

BRIEF SUMMARY OF THE INVENTION

The invention provides a data storage device. In one embodiment, the data storage device is coupled to a host and comprises a storage medium, a random access memory, and a controller. In one embodiment, a logical memory space accessed by the host is divided into a plurality of logical address ranges, and each of the logical address ranges is further divided into a plurality of logical address sets. The storage medium stores a plurality of link tables, wherein each of the link tables corresponds to one of the logical address sets and stores a mapping relationship between physical and logical addresses of the corresponding logical address set. The random access memory comprises a plurality of storage units, wherein each of the storage units corresponds to one of the logical address ranges and stores one of the link tables corresponding to the logical address sets belonging to the corresponding logical address range. The controller receives a target logical address from the host, determines a target link table corresponding to the logical address set comprising the target logical address, determines a target storage unit corresponding to the logical address range comprising the target logical address, determines whether the target storage unit has stored the target link table, and when the target storage unit has stored the target link table, determines a target physical address mapped to the target logical address according to a mapping relationship stored in the target link table, and accesses data stored in the storage medium according to the target physical address.

The invention provides a data access method. In one embodiment, a logical memory space accessed by a host is divided into a plurality of logical address ranges, and each of the logical address ranges is divided into a plurality of logical address sets. First, mapping relationships between physical and logical addresses of the logical address sets are stored in a plurality of link tables of a storage medium, wherein the link tables respectively correspond to the logical address sets. A plurality of storage units of a random access memory are respectively dedicated to the logical address ranges. A target logical address is then received from the host. A target link table corresponding to the logical address set comprising the target logical address is then determined. A target storage unit corresponding to the logical address range comprising the target logical address is then determined. Whether the target storage unit has stored the target link table is then determined. When the target storage unit has stored the target link table, a target physical address mapped to the target logical address is determined according to a mapping relationship stored in the target link table, and data stored in the storage medium is accessed according to the target physical address.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
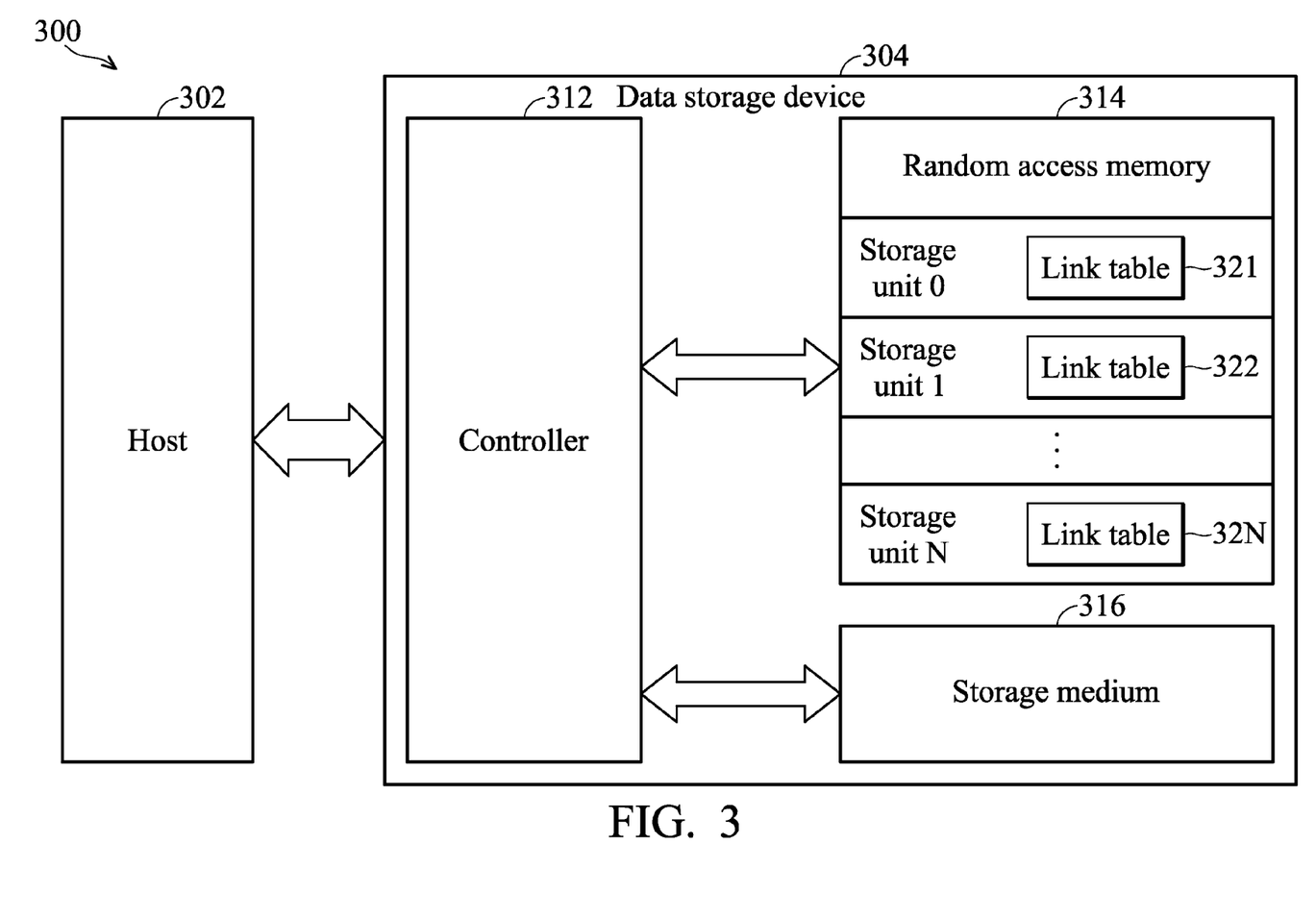
FIG. 3 is a block diagram of a data storage device according to the invention.

Referring to FIG. 3, a block diagram of a data storage device 304 according to the invention is shown. The data storage device 304 is coupled to a host 302, and accesses data stored therein according to access commands sent from the host 302. In one embodiment, the data storage device 304 comprises a controller 312, a random access memory 314, and a storage medium 316. The storage medium 316 is for data storage and may be a flash memory or a hard disk. The controller 312 operates as an interface between the host 302 and the storage medium 316. When the host 302 sends read commands to the data storage device 304, the controller 312 retrieves data from the storage medium 316 according to addresses of the read commands, and then forwards the data to the host 302. When the host 302 sends write commands to the data storage device 304, the controller 302 writes data to the storage medium 316 according to addresses of the write commands. The random access memory 314 has a higher data access speed than that of the storage medium 316 and provides a storage space for temporary data processed by the controller 312.

The host 302 points out accessed data according to logical addresses, and the storage medium 316 accesses data stored therein according to physical addresses. When the controller 312 receives logical addresses from the host 302, the controller 312 converts the logical addresses to physical addresses and sends the physical addresses to the storage medium 316 and requests that the storage medium 316 accesses data according to the physical addresses. In one embodiment, the storage medium 316 stores a plurality of link tables, and each of the link tables stores a mapping relationship between physical and logical addresses of one of a plurality of logical address sets. In one embodiment, each logical address set comprises a predetermined number of logical addresses. The controller 312 therefore can convert logical addresses to physical addresses according to the mapping relationship stored in the link tables. Because the storage medium 316 has a lower data access speed, before logical addresses are converted to physical addresses according to a mapping relationship stored in a link table, the controller 312 must load the link table from the storage medium 316 to the random access memory 314.

In one embodiment, a logical memory space of the storage medium 316 for storing data of the host 302 is divided into a plurality of logical address ranges. Each of the logical address ranges is further divide into a plurality of logical address sets. In one embodiment, each logical address range comprises a first predetermined number of logical address sets, and each logical address set comprises a second predetermined number of logical addresses. For example, the logical memory space is divided into N logical address ranges. The random access memory 314 also comprises N storage units 321~32N, and each of the storage units corresponds to one of the logical address ranges. The storage units 321~32N are for storing one of the link tables storing the mapping relationships of logical address sets belonging to corresponding logical address ranges. For example, a storage unit 0 of the random access memory 314 corresponds to a logical address range 0. A plurality of link tables respectively stores mapping relationships of a plurality of logical address sets belonging to the logical address range 0, and the storage unit 0 stores a link table 321 selected from the link tables corresponding to a logical address set belonging to the logical address range 0. Similarly, a storage unit N of the random access memory 314 stores a link table 32N which stores a mapping relationship of a logical address set belonging to the corresponding logical address range N.

When the controller 312 receives a target logical address from the host 302, the controller 302 first determines a target storage unit that is corresponding to the logical address range comprising the target logical address, and then checks whether a link table stored in the target storage unit is a target link table storing the mapping relationship of the target logical address. When the link table stored in the target storage unit is not the target link table, because the target storage unit only stores one link table, the controller 312 can then determine that the random access memory 314 has not stored the target link table storing the mapping relationship for conversion of the target logical address. The controller 312 then directly retrieves the target link table from the storage medium 316, and stores the target link table to the target storage unit. Thus, the controller 312 merely checks whether the link table stored in the target storage unit is the target link table to determine whether the target link table is stored in the random access memory 314. In the conventional method 200, the controller must search all link tables stored in the random access memory for the target logical address to determine whether the target link table is stored in the random access memory, causing a long delay period for address conversion. Thus, in comparison with the conventional method 200, the delay period for address conversion is greatly shortened to improve performance of the data storage device 304.

Figure 4:
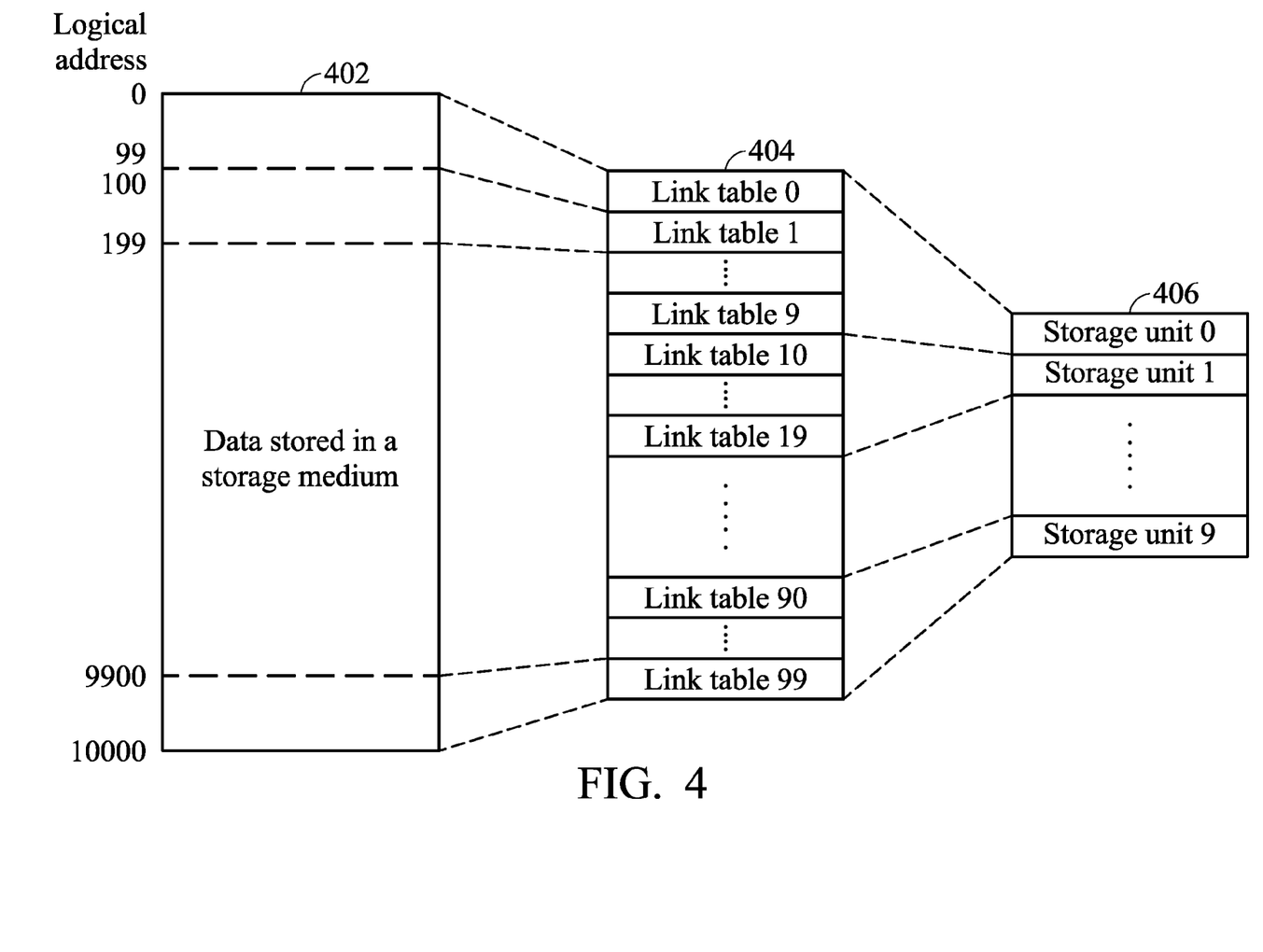
FIG. 4 is a schematic diagram of a mapping relationship between logical addresses, link tables, and storage units according to the invention.

Referring to FIG. 4, a schematic diagram of a mapping relationship between logical addresses, link tables, and storage units according to the invention is shown. Assume that a logical address space 402 accessed by the host 302 ranges from a start logical address 0 to an end logical address 10000, which corresponds to the memory space of the storage medium 316. Assume that the logical address space 402 is equally divided into 100 logical address sets, and each logical address set therefore comprises 100 logical addresses. The storage medium 316 therefore stores 100 link tables 404 with indexes 0~99, each of the link tables 404 stores a mapping relationship between physical and logical addresses of one of the 100 logical address sets. Thus, a link table stores a mapping relationship of 100 logical addresses. For example, the link table with an index 0 stores a mapping relationship of logical addresses 0~99, and the link table with an index 1 stores a mapping relationship of logical addresses 100~199. Assume that the logical address space 0~10000 are divided into 10 logical address ranges, each logical address range comprises 1000 logical addresses respectively belonging to 10 logical address sets. The 100 link tables are therefore correspondingly categorized into 10 groups, and each group corresponds to one of the 10 logical address sets. For example, the link tables with indexes 0~9 corresponds to the first logical address range, and the link tables with indexes 90~99 corresponds to the tenth logical address range. Similarly, the random access memory 314 comprises 10 storage units 406 respectively corresponding to one of the 10 logical address ranges. The storage unit 0 therefore stores one of the link tables 0~9 corresponding to the first logical address range, and the storage unit 9 stores one of the link tables 90~99 corresponding to the last logical address range.

Figure 5:
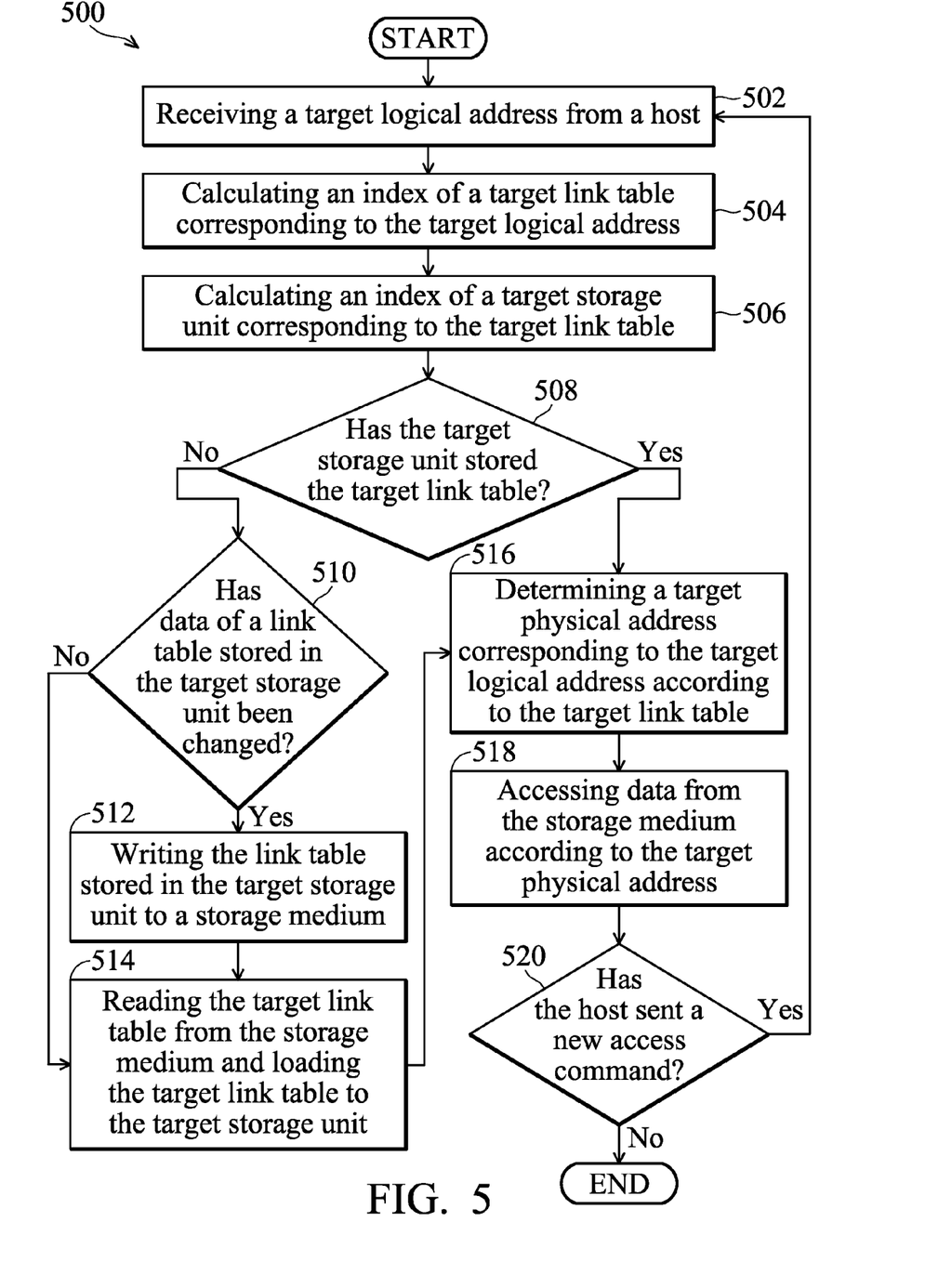
FIG. 5 is a flowchart of a data access method of a data storage device according to the invention.

Referring to FIG. 5, a flowchart of a data access method 500 of a data storage device 304 according to the invention is shown. First, the controller 312 receives a target logical address from the host 302 (step 520). To request that the storage medium 316 accesses data, the controller 312 must convert the target logical address to a target physical address. The controller 312 therefore must obtain a target link table storing address mapping relationship of the target logical address. First, the controller 312 calculates an index of the target link table storing an address mapping relationship of the target logical address (step 504), and then calculates an index of a target storage unit corresponding to the target link table (step 506).

In one embodiment, each of the link table stores a mapping relationship between a first predetermined number of logical addresses and physical addresses. The controller 312 therefore divides the target logical address by the first predetermined number to obtain an index of the target link table. In one embodiment, each of the storage units corresponds to a second predetermined number of link tables. The controller 312 therefore divides the index of the target link table by the second predetermined number to obtain an index of the target storage unit. For example, assume that the controller 312 receives a target logical address 2110 in the logical address space 402 of FIG. 4 from the host 302. Because each link table stores a mapping relationship of 100 logical addresses, the controller 312 divides the target logical address 2110 by 100 to obtain an index 21 of a target link table. Because each logical address range comprises 10 logical address sets, each storage unit therefore corresponds to 10 link tables, and the controller 312 therefore divides the index 21 of the target link table by 10 to obtain an index 2 of the target storage unit. In other words, the target link table storing the mapping relationship of the target logical address 2110 may be stored in the target storage unit 2 of the random access memory 314.

The controller 312 then checks whether the target storage unit has the stored target link table (step 508). Because the controller 312 has obtained the index of the target storage unit, the controller 312 may directly read an index of a link table stored in the target storage unit, and then compare the index of the link table stored in the target storage unit with the index of the target link table. When the index of the link table stored in the target storage unit is equal to the index of the target link table, the target storage unit is determined to comprise the stored target link table. Otherwise, the target storage unit is determined to not comprise the stored target link table.

If the target storage unit has not stored the target link table (step 508), the controller 312 then determines whether data of the link table stored in the target storage unit has been changed (step 510). In one embodiment, each storage unit of the random access memory 314 has a corresponding flag stored in the controller 312, and the flags indicate whether data of link tables stored in the corresponding storage units has been changed. The controller 312 therefore determines whether data of the link table stored in the target storage unit has been changed according to a value of the flag corresponding to the target storage unit. If the data of the link table stored in the target storage unit has been changed (step 510), the controller 312 writes the link table stored in the target storage unit to the storage medium 316 (step 512), then retrieves the target link table from the storage medium 316, and writes the target link table to the target storage unit (step 514). If the data of the link table stored in the target storage unit is not changed (step 510), the controller 312 directly retrieves the target link table from the storage medium 316, and writes the target link table to the target storage unit as a reference for address conversion (step 514).

Because the target storage unit of the random access memory 314 has stored the target link table, the controller 312 may then converts the target logical address to a target physical address according to the address mapping relationship stored in the target link table (step 516). The controller 312 then sends an access command comprising the target physical address to the storage medium 316 to request that the storage medium 316 accesses data stored according to the target physical address (step 518). Finally, the controller 312 checks whether the host 302 has sent a new access command to the data storage device 304 (step 520). If the host 302 has sent a new access command to the data storage device 304, the controller 312 performs steps 502~518 to execute the access command and access data stored in the storage medium 316.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, coupled to a host, wherein a logical memory space accessed by the host is divided into a plurality of logical address ranges, and each of the logical address ranges is further divided into a plurality of logical address sets, and the data storage device comprises:
    a storage medium, storing a plurality of a link tables, wherein each of the link tables corresponds to one of the logical address sets and stores a mapping relationship between physical and logical addresses of the corresponding logical address set;
    a random access memory, comprising a plurality of storage units, wherein each of the storage units corresponds to one of the logical address ranges and stores one of the link tables corresponding to the logical address sets belonging to the corresponding logical address range; and
    a controller, receiving a target logical address from the host, determining a target link table corresponding to the logical address set comprising the target logical address, determining a target storage unit corresponding to the logical address range comprising the target logical address, determining whether the target storage unit has stored the target link table, and when the target storage unit has stored the target link table, determining a target physical address mapped to the target logical address according to a mapping relationship stored in the target link table, and accessing data stored in the storage medium according to the target physical address.

2. The data storage device as claimed in claim 1, wherein when the target storage unit has not stored the target link table, the controller retrieves the target link table from the storage medium, and writes the target link table to the target storage unit of the random access memory.

3. The data storage device as claimed in claim 2, wherein after the controller writes the target link table to the target storage unit, the controller determines the target physical address mapped to the target logical address according to the mapping relationship stored in the target link table, and then accesses data stored in the storage medium according to the target physical address.

4. The data storage device as claimed in claim 1, wherein when the target storage unit has not stored the target link table, the controller determines whether data of a second link table stored in the target storage unit has been changed, and the controller writes changed data of the second link table to the storage medium when data of the second link table has been changed.

5. The data storage device as claimed in claim 4, wherein the controller comprises a plurality of flags respectively corresponding to the storage units, and the flags indicate whether data of link tables stored in the corresponding storage units have been changed, and the controller detects the flag corresponding to the target storage unit to determine whether data of the second link table stored in the target storage unit has been changed.

6. The data storage device as claimed in claim 1, wherein each of the logical address sets comprises a first predetermined number of logical addresses, and when the controller determines the target link table, the controller divides the target logical address by the first predetermined number to obtain an index of the target link table.

7. The data storage device as claimed in claim 6, wherein each of the logical address ranges comprises a second predetermined number of logical address sets, and when the controller determines the target storage unit, the controller divides the index of the target link table by the second predetermined number to obtain an index of the target storage unit.

8. The data storage device as claimed in claim 1, wherein the controller compares a first index of a link table stored in the target storage unit with a second index of the target link table, and determines that the target storage unit has stored the target link table when the first index is equal to the second index.

9. The data storage device as claimed in claim 1, wherein the storage medium is a flash memory.

10. The data storage device as claimed in claim 1, wherein the storage medium is a hard disk.

11. A data access method, wherein a logical memory space accessed by a host is divided into a plurality of logical address ranges, and each of the logical address ranges is divided into a plurality of logical address sets, and the method comprises:
    respectively storing a plurality of mapping relationships between physical and logical addresses of the logical address sets in a plurality of link tables of a storage medium, wherein the link tables respectively correspond to the logical address sets;
    dedicating a plurality of storage units of a random access memory respectively to the logical address ranges;
    receiving a target logical address from the host;
    determining a target link table corresponding to the logical address set comprising the target logical address;
    determining a target storage unit corresponding to the logical address range comprising the target logical address;
    determining whether the target storage unit has stored the target link table; and
    when the target storage unit has stored the target link table, determining a target physical address mapped to the target logical address according to a mapping relationship stored in the target link table, and accessing data stored in the storage medium according to the target physical address, wherein the mapping relationship stored in the target link table is one of the plurality of mapping relationships.

12. The data access method as claimed in claim 11, wherein the method further comprises:
    when the target storage unit has not stored the target link table, retrieving the target link table from the storage medium, and writing the target link table to the target storage unit of the random access memory.

13. The data access method as claimed in claim 12, wherein the method further comprises:
    after the target link table is written to the target storage unit, determining the target physical address mapped to the target logical address according to the mapping relationship stored in the target link table, and then accessing data stored in the storage medium according to the target physical address.

14. The data access method as claimed in claim 11, wherein the data further comprises:
- when the target storage unit has not stored the target link table, determining whether data of a second link table stored in the target storage unit has been changed; and
- when data of the second link table has been changed, writing changed data of the second link table to the storage medium.

15. The data access method as claimed in claim 14, wherein a plurality of flags respectively correspond to the storage units, and the flags indicate whether data of link tables stored in the corresponding storage units have been changed, and the method further comprises:
- detecting the flag corresponding to the target storage unit to determine whether data of the second link table stored in the target storage unit has been changed.

16. The data access method as claimed in claim 11, wherein each of the logical address sets comprises a first predetermined number of logical addresses, and determination of the target link table comprises dividing the target logical address by the first predetermined number to obtain an index of the target link table.

17. The data access method as claimed in claim 16, wherein each of the logical address ranges comprises a second predetermined number of logical address sets, and determination of the target storage unit comprises dividing the index of the target link table by the second predetermined number to obtain an index of the target storage unit.

18. The data access method as claimed in claim 11, wherein determination of whether the target storage unit has stored the target link table comprises:
- comparing a first index of a link table stored in the target storage unit with a second index of the target link table; and
- determining that the target storage unit has stored the target link table when the first index is equal to the second index.

* * * * *